United States Patent
Ishii

(10) Patent No.: US 9,611,972 B2
(45) Date of Patent: Apr. 4, 2017

(54) PIPE HAVING HEAT-RESISTANT AND CORROSION-RESISTANT PLATING LAYER THAT HAS EXCELLENT WORKABILITY

(71) Applicant: USUI KOKUSAI SANGYO KAISHA LIMITED, Shimizu-cho, Sunto-gun, Shizuoka (JP)

(72) Inventor: Yasushige Ishii, Shimizu-cho (JP)

(73) Assignee: USUI KOKUSAI SANGYO KAISHA LIMITED, Shimizu-cho, Sunto-gun (JP)

( * ) Notice: Subject to any disclaimer, the term of this patent is extended or adjusted under 35 U.S.C. 154(b) by 0 days.

(21) Appl. No.: 14/408,111

(22) PCT Filed: Jun. 27, 2013

(86) PCT No.: PCT/JP2013/067670
§ 371 (c)(1),
(2) Date: Dec. 15, 2014

(87) PCT Pub. No.: WO2014/007139
PCT Pub. Date: Jan. 9, 2014

(65) Prior Publication Data
US 2015/0144220 A1    May 28, 2015

(30) Foreign Application Priority Data
Jul. 4, 2012    (JP) .................. 2012-150831

(51) Int. Cl.
*F16L 9/02*    (2006.01)
*F16L 58/08*    (2006.01)
(Continued)

(52) U.S. Cl.
CPC ............ *F16L 58/08* (2013.01); *C23C 28/321* (2013.01); *C23C 28/345* (2013.01); *C25D 5/14* (2013.01);
(Continued)

(58) Field of Classification Search
USPC .................................................. 138/143, 146
See application file for complete search history.

(56) References Cited

U.S. PATENT DOCUMENTS 4,849,301 A * 7/1989 Kanasashi .................... 428/623
4,885,215 A * 12/1989 Yoshioka ............... C25D 5/028
   138/143
(Continued)

FOREIGN PATENT DOCUMENTS

GB    2 225 591    6/1990
JP    2-120034    5/1990
(Continued)

OTHER PUBLICATIONS

International Search Report of Jul. 24, 2013.

*Primary Examiner* — James Hook
(74) *Attorney, Agent, or Firm* — Gerald E. Hespos; Michael J. Porco; Matthew T. Hespos

(57) ABSTRACT

Provided is a pipe having a heat-resistant and corrosion-resistant multi-layered plated layer excellent in workability. The pipe includes a multi-layered plated layer including: a ZnNi alloy plated layer that has a Ni content of 5% to 9% and a layer thickness of 3 μm to 9 μm and is formed as a first layer on a surface of a base steel pipe; another ZnNi alloy plated layer that has a Ni content of 10% to 15% and a layer thickness of 1 μm to 3 μm and is deposited as a second layer on the ZnNi alloy plated layer formed as the first layer; and a chromate film that is formed on the ZnNi alloy plated layer formed as the second layer.

1 Claim, 1 Drawing Sheet

(51) Int. Cl.
*C25D 7/04* (2006.01)
*C25D 5/14* (2006.01)
*C25D 5/48* (2006.01)
*C25D 11/38* (2006.01)
*C23C 28/00* (2006.01)

(52) U.S. Cl.
CPC ............... *C25D 5/48* (2013.01); *C25D 7/04* (2013.01); *C25D 11/38* (2013.01); *F16L 9/02* (2013.01)

(56) References Cited

U.S. PATENT DOCUMENTS

| | | | |
|---|---|---|---|
| 5,277,228 A * | 1/1994 | Yamanashi | 138/143 |
| 5,297,410 A * | 3/1994 | Goff | 72/47 |
| 5,330,850 A * | 7/1994 | Suzuki et al. | 428/623 |
| 5,520,223 A * | 5/1996 | Iorio | B29C 63/486 |
| | | | 138/137 |
| 5,590,691 A * | 1/1997 | Iorio et al. | 138/146 |
| 6,071,631 A | 6/2000 | Takahata | |
| 6,085,800 A * | 7/2000 | Usui | F02M 55/02 |
| | | | 138/142 |
| 6,276,400 B1 * | 8/2001 | Jackson et al. | 138/143 |
| 6,293,311 B1 * | 9/2001 | Bushi | B29C 47/0023 |
| | | | 138/138 |
| 6,325,107 B1 | 12/2001 | Usui | |
| 2001/0029990 A1 * | 10/2001 | Takahashi et al. | 138/146 |
| 2002/0005223 A1 * | 1/2002 | Campagna et al. | 138/146 |
| 2005/0236060 A1 * | 10/2005 | Matsubara | 138/143 |
| 2006/0054231 A1 * | 3/2006 | Wolfram | B65G 53/32 |
| | | | 138/109 |
| 2008/0131721 A1 * | 6/2008 | Tran | C25D 3/565 |
| | | | 428/613 |
| 2012/0234428 A1 * | 9/2012 | Tomomori et al. | 138/146 |

FOREIGN PATENT DOCUMENTS

| | | |
|---|---|---|
| JP | 4-2783 | 1/1992 |
| JP | 8-134685 | 5/1996 |
| JP | 8-188884 | 7/1996 |
| JP | 10-121267 | 5/1998 |

* cited by examiner

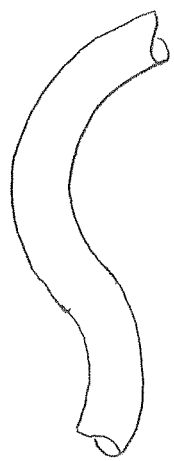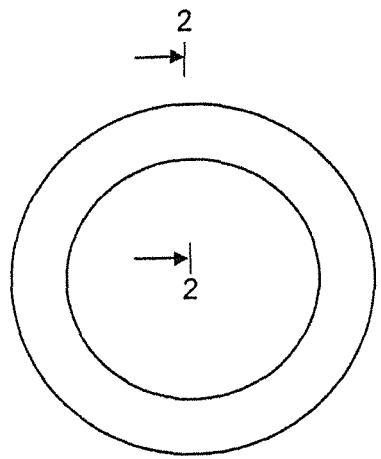
FIG. 1A  FIG. 1B
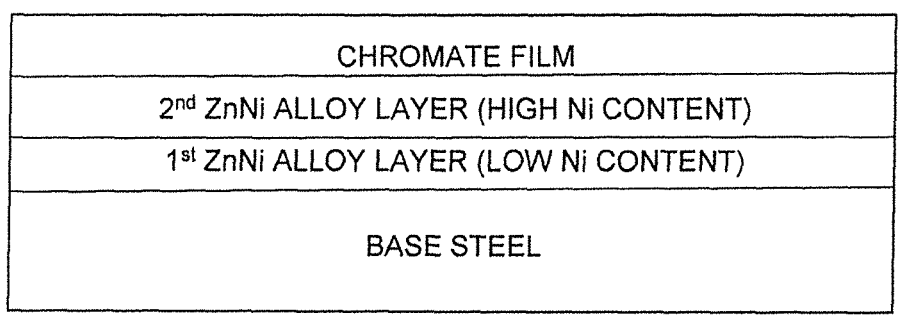
FIG. 2

PIPE HAVING HEAT-RESISTANT AND CORROSION-RESISTANT PLATING LAYER THAT HAS EXCELLENT WORKABILITY

BACKGROUND

1. Field of the Invention

The present invention relates to a pipe for an automobile, the pipe having a heat-resistant and corrosion-resistant plated layer that is excellent in workability. More specifically, the invention relates to a pipe that includes a ZnNi-alloy plated layer as a heat-resistant and corrosion-resistant plated layer on an outer surface of a base steel pipe and that has excellent workability.

2. Description of the Related Art

Conventionally, a product, in which a Zn plated layer is formed on a surface of a steel pipe and a chromate film is then formed thereon, has been widely used, for example, as a fuel pipe of an automobile. However, when such a product after a plated-layer treatment is subject to a bending process, corrosion resistance of a bent portion is significantly damaged, and thus heat resistance is also insufficient. In addition, a temperature inside an engine room has increased due to a reduction in an engine size (miniaturization) of an automobile in consideration of low fuel consumption and environmental countermeasure, and accordingly, a demand for higher heat resistance and corrosion resistance has also increased with respect to a pipe to be used inside the engine room.

With regard to heat-resistance and corrosion-resistant plating excellent in workability, the following steel materials have been suggested: a heat-resistant and corrosion-resistant multi-layered plating steel material in which a Ni plated layer is formed as a first layer on a surface of a base material, and a chromate treatment is then performed on a surface of a ZnNi alloy plated layer that is deposited on the Ni plated layer (refer to Japanese Patent Application Laid-Open No. 02-120034 A and Japanese Patent Application Laid-Open No. 10-121267); and a steel material in which a Ni plated layer is formed as a first layer, a ZnNi alloy plated layer is formed thereon as an intermediate layer using an acidic bath, and a ZnNi alloy plated layer is formed thereon as a third layer using an alkaline bath (refer to Japanese Patent Application Laid-Open No. 08-134685).

However, in a production process of a pipe for an automobile, such as a fuel pipe, it is preferable to bend a product after performing plating and chromate treatments on a long straight steel pipe from the viewpoints of productivity, cost, and the like. Accordingly, in the case of independently forming the ZnNi alloy plated layer on the Ni plated layer as described in the conventional art, there is a problem in that the plated film thickness on an end of a pipe becomes large and thereby the workability tends to deteriorate, or adhesiveness between the Ni plated layer and the ZnNi alloy plated layer decreases during bending process and thereby heat resistance and corrosion resistance tend to decrease. In addition, even in the case of forming a plurality of the ZnNi alloy plated layers on the Ni plated layer, there is a problem in that complicated bath management and an increase in cost may be caused.

The present invention has been made to solve the problems in the conventional art, that is, a problem of workability deterioration in the case of a pipe including a ZnNi alloy plated layer independently formed on a Ni plated layer, a problem of a decrease in heat resistance and corrosion resistance due to a decrease in adhesiveness between the Ni plated layer and the ZnNi alloy plated layer during a bending process, and a problem of an increase in the cost in the case of the formation of a plurality of the ZnNi alloy plated layers on the Ni plated layer. Accordingly, an object of the invention is to provide a pipe that includes a heat-resistant and corrosion-resistant plated layer, does not required a Ni plated layer as a first layer, requires low cost, and has excellent workability and high quality.

SUMMARY OF THE INVENTION

The present inventors have made a thorough investigation on a heat-resistant and corrosion-resistant plated layer excellent in workability, as a result, they have found a configuration of a multilayer ZnNi-alloy plated layer, which exhibits excellent heat resistance and corrosion resistance even in a bent portion without forming a Ni plated layer as a first layer, by appropriately setting a Ni content rate of a ZnNi alloy plated layer.

It is known that the ZnNi alloy plated layer is excellent in heat resistance and corrosion resistance, but is lack of workability, and that a plated film thickness and a Ni content rate greatly affect the ZnNi alloy plated layer, for example, in a bent portion of a fuel injection pipe. Specifically, with regard to the ZnNi alloy plated layer, in a case where the plated film thickness and the Ni content rate are large, this configuration advantageously operates for the corrosion resistance at a non-bent portion (such as straight pipe portion). However, at a bent portion of the pipe, as the plated film thickness increases, a danger of "plating peeling" increases and the probability of a decrease in corrosion resistance increases accordingly, and thus no desired corrosion resistance is obtained in a plated film thickness determined in consideration of workability. Similarly, with regard to a Ni content, too high content of Ni occurs the workability deteriorates, and when the Ni content is therefore set to be low in consideration of workability, no desired corrosion resistance is obtained. In light of these technical findings, the present inventors have found a configuration of the multi-layer ZnNi-alloy plated layer which has substantially the same corrosion resistance at the bent portion of the fuel injection pipe, even not forming a Ni plated layer, by forming a ZnNi alloy plated layer having a Ni content rate higher than a Ni content rate of a first layer on a ZnNi alloy plated layer that is formed as the first layer on a surface of a base material.

More particularly, according to an aspect of the present invention, there is provided a pipe including a heat-resistant and corrosion-resistant plated layer excellent in workability, the pipe including a multi-layered plated layer composed of: a ZnNi alloy plated layer that is formed as a first layer on a surface of a base steel pipe and has a Ni content of 5% to 9% and a layer thickness of 3 μm to 9 μm; another ZnNi alloy plated layer that is deposited as a second layer on the ZnNi alloy plated layer of the first layer and has the Ni content of 10% to 15% and the layer thickness of 1 μm to 3 μm; and a chromate film that is formed on the ZnNi alloy plated layer of the second layer.

According to the present invention, a low Ni content of a ZnNi alloy plated layer advantageous to workability is set as a first layer that is formed on a surface of a base steel pipe, and another ZnNi alloy plated layer with emphasis on corrosion resistance and having a Ni content rate higher than that of the first layer is set as a second layer that is deposited on the first layer. According to this configuration, the second layer as a surface layer is excellent in initial anti-corrosion performance and thus an adverse effect of the second layer on the first layer as a lower layer can be reduced during bending, accordingly it is possible to endure a bending process of a fuel pipe after formation of the multi-layered plated layer. As a result, even when a Ni plated layer is not included as the first layer, it is possible to attain substantially the same heat resistant and corrosion resistance at a bent portion of the fuel pipe. In addition, it is possible to reduce the kinds of plating bath required in a production step or the number of coated layers in a product, and thus it is advantageous when considering complication in management of a plating solution and the cost.

BRIEF DESCRIPTION OF THE DRAWINGS

FIG. 1A is top plan view of a pipe in accordance with the invention and FIG. 1B is an end elevational view of the pipe shown in FIG. 1A.

FIG. 2 is a cross-sectional view taken along line 2-2 in FIG. 1B.

DETAILED DESCRIPTION

In the present invention, the layer thickness of a ZnNi alloy plated layer formed as a first layer on a surface of a base steel pipe is limited to 3 μm to 9 μm. This is because it is difficult to obtain sufficient heat resistance and corrosion resistance when the layer thickness is less than 3 μm, while, when the layer thickness exceeds 9 μm, plating peeling which can be visually confirmed may occur at a bent portion, which leads to a problem in quality of external appearance. In addition, the layer thickness of another ZnNi alloy plated layer formed as a second layer is limited to 1 μm to 3 μm because, as is the case with the ZnNi alloy plated layer of the first layer, it is difficult to attain sufficient heat resistance and corrosion resistance when the layer thickness is less than 1 μm, while when the layer thickness exceeds 3 μm, plating peeling which can be visually confirmed may occur at a bent portion, which leads to a problem in quality of external appearance.

Furthermore, a Ni content of the ZnNi alloy plated layer formed as a first layer is limited to 5% to 9% and a Ni content of the ZnNi alloy plated layer formed as a second layer is 10% to 15% because of the following reasons.

The Ni content rates of the first and second layers are required to be set in such a way that the second layer has the Ni content rate higher than that of the first layer when considering workability and corrosion resistance. This is because, by providing a high Ni-content of ZnNi alloy plated layer excellent in corrosion resistance on a surface layer, initial anti-corrosion performance is also excellent at a bent portion, and further a low Ni content of ZnNi alloy plated layer formed as the first layer is less likely to be adversely affected even under the adverse effect due to bending process thanks to the presence of the second layer having excellent corrosion resistance on the first layer. In contrast, in a case where the first layer has a Ni content rate higher than that of the second layer, the workability and the initial anti-corrosion performance on a surface layer thereof are poor, and thus obtained corrosion resistance is inferior to the corrosion resistance in the case of forming the high content of the ZnNi plated layer as the second layer on the low content of the Ni plated layer formed as the first layer. Accordingly, with regard to the Ni content rates of the first and second layers, it is necessary for the second layer to have the Ni content rate higher than that of the first layer. Specifically, the Ni content rate of the ZnNi alloy plated layer formed as the first layer is defined to 5% to 9% because it is difficult to attain sufficient heat resistance and corrosion resistance when the ZnNi alloy plated layer of the first layer has the Ni content of less than 5%, while when the Ni content exceeds 9%, plating peeling may occur at a bent portion, which leads to a problem in quality of external appearance. In addition, the Ni content rate of the ZnNi alloy plated layer formed as the second layer is defined to 10% to 15%, because, as is the case with the first layer, it is difficult to attain sufficient heat resistance and corrosion resistance when the Ni content is less than 10%, while when the Ni content exceeds 15%, plating peeling may occur at a bent portion, which leads to a problem in quality of external appearance.

EXAMPLES

The invention will be described in more detail on the basis of the following examples. However, the invention is not limited to the following examples, and modifications and alterations, which are made in a range not departing from the gist of the invention, are included in the technical range of the invention.

Example 1

A steel pipe for fuel line with a diameter of 8 mm was used. A ZnNi alloy plated layer having a Ni content of 5% and a layer thickness of 3 μm was formed as a first layer on a surface of the steel pipe under conditions of a solution temperature of 15° C. to 25° C. and a current density of 5 A/dm$^2$. Subsequently, another ZnNi alloy plated layer having a Ni content of 10% and a layer thickness of 1 μm was formed as a second layer under conditions of a solution temperature of 15° C. to 25° C. and a current density of 5 A/dm$^2$. Then, a chromate treatment was performed on the second layer with pH 4.0 at a solution temperature of 30° C. for 60 seconds.

In this regard, when forming the ZnNi alloy plated layer as the first layer in this example, a plating solution containing Zn: 9.0 g/L, Ni: 2.2 g/L, NaOH: 125.6 g/L, and appropriate amount of complexing agent and brightening agent was used. In addition, when forming the ZnNi alloy plated layer as the second layer, a plating solution containing Zn: 8.0 g/L, Ni: 1.4 g/L, NaOH: 130.0 g/L, and appropriate amount of complexing agent and brightening agent was used.

A steel pipe for fuel line including the obtained multi-layered ZnNi-alloy plated layer was bent with R15, and peeling of the bent portion in external appearance was observed visually. Next, the sample after bending was heated at 150° C. for 24 hours, and then corrosion resistance was evaluated with a salt spraying test on the basis of JIS Z 2371. Test results are shown in Table 1.

Example 2

By the same process of forming plated layers as in Example 1, a ZnNi alloy plated layer having a Ni content of 5% and a layer thickness of 3 μm was formed as the first layer on a surface of a steel pipe for fuel line with a diameter 8 mm, and subsequently, another ZnNi alloy plated layer having a Ni content of 10% and a layer thickness of 3 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are shown in Table 1.

Example 3

By the same process of forming plated layers as in Example 1, a ZnNi alloy plated layer having a Ni content of 5% and a layer thickness of 5 μm was formed as the first layer on a surface of a steel pipe for fuel line with a diameter 8 mm, and subsequently, another ZnNi alloy plated layer having a Ni content of 10% and a layer thickness of 1 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are shown in Table 1.

Example 4

By the same process of forming plated layers as in Example 1, a ZnNi alloy plated layer having a Ni content of 5% and a layer thickness of 5 μm was formed as the first layer on a surface of a steel pipe for fuel line with a diameter 8 mm, and subsequently, another ZnNi alloy plated layer having a Ni content of 10% and a layer thickness of 3 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are shown in Table 1.

Example 5

By the same process of forming plated layers as in Example 1, a ZnNi alloy plated layer having a Ni content of 9% and a layer thickness of 9 μm was formed as the first layer on a surface of a steel pipe for fuel line with a diameter 8 mm, and subsequently, another ZnNi alloy plated layer having a Ni content of 15% and a layer thickness of 3 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are shown in Table 1.

Comparative Example 1

By the same process of forming plated layers as in Example 1, a ZnNi alloy plated layer having a Ni content of 4% and a layer thickness of 2 μm was formed as the first layer on a surface of a steel pipe for fuel line with a diameter 8 mm, and subsequently, another ZnNi alloy plated layer having a Ni content of 9% and a layer thickness of 0.8 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Comparative Example 2

By the same process of forming plated layers as in Example 1, a ZnNi alloy plated layer having a Ni content of 10% and a layer thickness of 10 μm was formed as the first layer on a surface of a steel pipe for fuel line with a diameter 8 mm, and subsequently, another ZnNi alloy plated layer having a Ni content of 16% and a layer thickness of 4 μm was formed as the second layer. Then, a chromate film was formed on the second layer.

In the same way as in Example 1, the peeling test in external appearance and the salt spraying test were performed with respect to a steel pipe for fuel line including the obtained multi-layered ZnNi alloy plated layer, and the results are also shown in Table 1.

Comparative Example 3

By the same process of forming plated layers as in Example 1, a ZnNi alloy plated layer having a Ni content of 10% and a layer thickness of 1 μm was formed as the first layer on a surface of a steel pipe for fuel line with a diameter 8 mm, and subsequently, another ZnNi alloy plated layer having a Ni content of 5% and a layer thickness of 3 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Comparative Example 4

By the same process of forming plated layers as in Example 1, a ZnNi alloy plated layer having a Ni content of 10% and a layer thickness of 3 μm was formed as the first layer on a surface of a steel pipe for fuel line with a diameter 8 mm, and subsequently, another ZnNi alloy plated layer having a Ni content of 5% and a layer thickness of 3 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Comparative Example 5

By the same process of forming plated layers as in Example 1, a ZnNi alloy plated layer having a Ni content of 10% and a layer thickness of 1 μm was formed as the first layer on a surface of a steel pipe for fuel line with a diameter 8 mm, and subsequently, another ZnNi alloy plated layer having a Ni content of 5% and a layer thickness of 5 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Comparative Example 6

By the same process of forming plated layers as in Example 1, a ZnNi alloy plated layer having a Ni content of 10% and a layer thickness of 3 μm was formed as the first layer on a surface of a steel pipe for fuel line with a diameter 8 mm, and subsequently, another ZnNi alloy plated layer having a Ni content of 5% and a layer thickness of 5 μm was formed as the second layer. Then, a chromate film was formed on the second layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Conventional Example 1

A Ni plated layer having a layer thickness of 0.5 μm was formed as the first layer on a surface of the same steel pipe for fuel line as in Example 1, and subsequently, a ZnNi alloy plated layer having a Ni content of 8% and a layer thickness of 5 μm was formed as the second layer. Furthermore, another ZnNi alloy plated layer having a Ni content of 5% and a layer thickness of 5 μm was formed as a third layer in the same manner as in Example 1, and then a chromate film was formed on the third layer.

The Ni plated layer as the first layer in the Conventional Example was formed using a Watt bath under conditions of a solution temperature of 52° C. to 57° C. and a current density of 5 A/dm². In addition, the ZnNi alloy plated layer as the second layer was formed using an acid bath with pH 5.7 containing 100 g/L of $ZnCl_2$, 130 g/L of $NiCl_2 \cdot 6H_2O$, and 200 g/L of $NH_4Cl$, under conditions of a solution temperature of 34° C. to 36° C. and a current density of 3 A/dm².

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

Conventional Example 2

By the same process as in Conventional Example 1, a Ni plated layer having a layer thickness of 3 μm was formed as the first layer on a surface of the same steel pipe for fuel line as in Example 1, a ZnNi alloy plated layer having a Ni content of 8% and a layer thickness of 5 μm was formed as the second layer, and then another ZnNi alloy plated layer having a Ni content of 5% and a layer thickness of 5 μm was further formed as the third layer in the same manner as in Example 1. Then, a chromate film was formed on the third layer.

In the same way as in Example 1, the peeling test in external appearance and the salt spraying test on the bent portion were performed with respect to a steel pipe for fuel line including the obtained multi-layered ZnNi-alloy plated layer, and the results are also shown in Table 1.

From the results in Table 1, it can be considered as follows.

(1) In all of the steel pipes for fuel line of the present invention shown in Examples 1 to 5 where a low Ni content of a ZnNi alloy plated layer advantageous to workability was formed as the first layer in a layer thickness of 3 μm to 9 μm, and another ZnNi alloy plated layer, which made a much account of corrosion resistance and had a Ni content rate higher than that of the first layer, was formed as the second layer in a layer thickness of 1 μm to 3 μm, the plating peeling phenomenon on the bent portion is not found at all. In addition, as is clear from time before red rust occurs at the bent portion, the steel pipes are excellent in corrosion resistance. As a result, even when no Ni plated layer is provided as the first layer, it is possible to attain substantially the same heat resistance and corrosion resistance at the bent portion of the pipe.

(2) As is clear from the results (time before red rust occurs at a bent portion) of the salt spraying test, the steel pipe of Comparative Example 1 where both of the layer thicknesses of the ZnNi alloy plated layers as the first and second layers were not in the range of the defined values according to the present invention (not more than the defined range), is greatly inferior to the steel pipes of Examples 1 to 5 of the present invention, and thus Comparative Example 1 is not preferable.

(3) As for the steel pipe of Comparative Example 2 where both of the layer thicknesses of the ZnNi alloy plated layers as the first and second layers were not in the range of the defined values according to the present invention (not less than the defined layer thickness), the plating peeling occurred on the bent portion, and thus it is unsuitable for employing this steel pipe as a steel pipe for fuel line.

(4) As is clear from the results (time before red rust occurs at a bent portion) of the salt spraying test, all of Comparative Examples 3 to 6, where the Ni content rate of the first layer was higher than that of the second layer, show greatly inferior results to Examples 1 to 5 of the present invention, and thus Comparative Examples 3 to 6 are not preferable.

(5) In Conventional Examples 1 and 2, where the first layer was composed of the Ni plated layer and the second and third layers were composed of the ZnNi alloy plated layers, the pipes can endure a bending process, but the results (time before red rust occurred at a bent portion) of the salt spraying test show inferior to those in Examples 1 to 5 of the present invention. As a result, it is clear that there is a problem in the multilayer plating configuration.

In addition, the description has been given to examples of only a steel pipe for fuel line herein. However, it is needless to say that application to not only the steel pipe for fuel line but also various pipes of an automobile can also bring about the same operational effect, and thus examples relating to different pipes for an automobile other than the steel pipe for fuel line are omitted.

TABLE 1

| | | First layer | | | Second layer | | | Third layer | | | Time before red |
|---|---|---|---|---|---|---|---|---|---|---|---|
| | | Plating | Layer thickness (μm) | Ni content (%) | Plating | Layer thickness (μm) | Ni content (%) | Plating | Layer thickness (μm) | Ni content (%) | peeling at bent portion | rust occurs in bent portion (hr) |
| Present Invention | 1 | ZnNi | 3 | 5 | ZnNi | 1 | 10 | — | — | — | Not present | 3500 |
| | 2 | ZnNi | 3 | 5 | ZnNi | 3 | 10 | — | — | — | Not present | 3500 |
| | 3 | ZnNi | 5 | 5 | ZnNi | 1 | 10 | — | — | — | Not present | 3500 |
| | 4 | ZnNi | 5 | 5 | ZnNi | 3 | 10 | — | — | — | Not present | 3500 |
| | 5 | ZnNi | 9 | 9 | ZnNi | 3 | 15 | — | — | — | Not present | 3500 |

TABLE 1-continued

|  |  | First layer | | | Second layer | | | Third layer | | | peeling at bent portion | Time before red rust occurs in bent portion (hr) |
|---|---|---|---|---|---|---|---|---|---|---|---|---|
|  |  | Plating | Layer thickness (μm) | Ni content (%) | Plating | Layer thickness (μm) | Ni content (%) | Plating | Layer thickness (μm) | Ni content (%) |  |  |
| Comparative Example | 1 | ZnNi | 2 | 4 | ZnNi | 0.8 | 9 | — | — | — | Not present | 500 |
|  | 2 | ZnNi | 10 | 10 | ZnNi | 4 | 16 | — | — | — | Present | — |
|  | 3 | ZnNi | 1 | 10 | ZnNi | 3 | 5 | — | — | — | Not present | 1200 |
|  | 4 | ZnNi | 3 | 10 | ZnNi | 3 | 5 | — | — | — | Not present | 1500 |
|  | 5 | ZnNi | 1 | 10 | ZnNi | 5 | 5 | — | — | — | Not present | 1000 |
|  | 6 | ZnNi | 3 | 10 | ZnNi | 5 | 5 | — | — | — | Not present | 1200 |
| Conventional Example | 1 | Ni | 0.5 | — | ZnNi | 5 | 8 | ZnNi | 5 | 5 | Not present | 2300 |
|  | 2 | Ni | 3 | — | ZnNi | 5 | 8 | ZnNi | 5 | 5 | Not present | 2500 |

The invention claimed is:

1. A fuel pipe, comprising:

a base steel pipe having an outer circumferential surface;

a first ZnNi alloy plated layer, having a Ni content of 5% to 9% and a layer thickness of 3 μm to 9 μm, formed directly on the outer circumferential surface of the base steel pipe, the first ZnNi alloy plated layer having an outer circumferential surface;

a second ZnNi alloy plated layer, having a Ni content of 10% to 15% and a layer thickness of 1 μm to 3 μm, deposited directly on the outer circumferential surface of the first ZnNi alloy plated layer, the second ZnNi alloy plated layer having an outer circumferential surface; and a chromate film, formed directly on the outer circumferential surface of the second ZnNi alloy plated layer, wherein the fuel pipe is bent into a specified non-linear shape.

* * * * *